US012480648B2

(12) United States Patent
Chen et al.

(10) Patent No.: US 12,480,648 B2
(45) Date of Patent: Nov. 25, 2025

(54) MULTIFUNCTIONAL MODULE DEVICE AND LAMP

(71) Applicant: Radiant Opto-Electronics Corporation, Kaohsiung (TW)

(72) Inventors: Chung-Kuang Chen, Kaohsiung (TW); Shang-Chia Liu, Kaohsiung (TW); Chih-Hung Ju, Kaohsiung (TW); Cheng-Ang Chang, Kaohsiung (TW); Guo-Hao Huang, Kaohsiung (TW)

(73) Assignee: Radiant Opto-Electronics Corporation, Kaohsiung (TW)

(*) Notice: Subject to any disclaimer, the term of this patent is extended or adjusted under 35 U.S.C. 154(b) by 294 days.

(21) Appl. No.: 18/193,649

(22) Filed: Mar. 31, 2023

(65) Prior Publication Data

US 2023/0392777 A1 Dec. 7, 2023

Related U.S. Application Data

(63) Continuation of application No. PCT/CN2022/121104, filed on Sep. 23, 2022.

(30) Foreign Application Priority Data

Jun. 1, 2022 (CN) ......................... 202210618580.5

(51) Int. Cl.
*F21V 23/06* (2006.01)
*F21V 23/00* (2015.01)
*F21V 23/02* (2006.01)

(52) U.S. Cl.
CPC ............ *F21V 23/06* (2013.01); *F21V 23/001* (2013.01); *F21V 23/02* (2013.01)

(58) Field of Classification Search
CPC ...... F21V 21/008; F21V 17/00; F21V 17/002; F21V 17/005; F21V 17/10; F21V 17/105;
(Continued)

(56) References Cited

U.S. PATENT DOCUMENTS 11,255,532 B1 2/2022 Tong
2018/0347801 A1 12/2018 O'Brien et al.
2021/0199271 A1 7/2021 Huang et al.

FOREIGN PATENT DOCUMENTS

CN 203147460 U 8/2013
CN 103775985 A 5/2014
(Continued)

OTHER PUBLICATIONS

Innovation Q+ NPL Search (Year: 2024).*

*Primary Examiner* — Anabel Ton
(74) *Attorney, Agent, or Firm* — CKC & Partners Co., LLC

(57) ABSTRACT

The present disclosure provides a multifunctional module device, including an electric connection module, a function module, and two electrically conductive elements. The electric connection module includes a body and an opening portion. The opening portion is disposed on the body. The function module is embedded in the opening portion and includes two electric contact portions. The electric contact portions are electrically connected to a positive electrode and a negative electrode of a DC power supply respectively, both power of the electric connection module and power of the function module are provided by the electrically conductive elements, and the electrically conductive elements are electrically connected to the electric contact portions. The present disclosure further provides a lamp including the aforementioned multifunctional module device.

14 Claims, 6 Drawing Sheets

(58) Field of Classification Search
CPC .... F21V 23/003; F21V 23/008; F21V 23/007; F21V 23/02; F21V 23/023; F21V 23/026; F21V 23/0042–0492; F21V 23/06; H01R 13/6205; H01R 13/30; F21S 8/06; F21S 8/061
See application file for complete search history.

(56) References Cited

FOREIGN PATENT DOCUMENTS

| | | | | | |
|---|---|---|---|---|---|
| CN | 105910034 | A | | 8/2016 | |
| CN | 105927938 | A | | 9/2016 | |
| CN | 107461679 | A | | 12/2017 | |
| CN | 108989742 | A | | 12/2018 | |
| CN | 109869673 | A | | 6/2019 | |
| CN | 110735758 | A | * | 1/2020 | |
| CN | 210891107 | U | | 6/2020 | |
| CN | 211978831 | U | | 11/2020 | |
| TW | M460994 | U1 | | 9/2013 | |
| WO | WO-2015011693 | A2 | * | 1/2015 | .............. F21S 2/005 |

* cited by examiner

MULTIFUNCTIONAL MODULE DEVICE AND LAMP

RELATED APPLICATIONS

This application is a continuation application of International Application No. PCT/CN2022/121104 filed on Sep. 23, 2022, which claims priority to China Application Number 202210618580.5, filed Jun. 1, 2022. The entire contents of each of which are incorporated by reference.

BACKGROUND

Field of Invention

The present disclosure relates to a module device and its application, and more particularly, to a multifunctional module device with replaceable module functions and a lamp using the multifunctional module device.

Description of Related Art

For giving added value to a conventional lamp, a non-decorative functional module can be mounted on the conventional lamp. By designing the lamp with compatible functions, not only the added value of the conventional lamp can be enhanced, but also consumer's purchasing intention can be enhanced.

However, when assembling the conventional lamp with the functional module, the functional module with independent power supply is usually embedded in the conventional lamp with another independent power supply, so the functional module and the conventional lamp respectively have independent power supplies. There is no electrical connection between the functional module and the conventional lamp. Not only the convenience of the electrical connection needs to be improved, but most consumers can't detach the original functional module from the conventional lamp or replace the original functional module with another functional module.

SUMMARY

Therefore, an objective of the present disclosure is to provide a multifunctional module device. The multifunctional module device is a convenient and quick power connection type, and consumers can easily detach and assemble at least one function module of the multifunctional module device by themselves. Another objective of the present disclosure is to provide a lamp including the multifunctional module device, and the consumers can detach and assemble another module of the lamp by themselves.

According to the aforementioned objectives, the present disclosure provides a multifunctional module device, which includes an electric connection module, a function module, and two electrically conductive elements. The electric connection module includes a body and an opening portion. The opening portion is mounted in the body. The function module is embedded in the opening portion and includes two electric contact portions. Said electrically conductive elements are electrically connected to a positive electrode and a negative electrode of a DC power supply respectively, the electric connection module and the function module are powered by said electrically conductive elements, and said electrically conductive elements are respectively electrically connected to said electric contact portions of the function module.

According to some embodiments of the present disclosure, the function module includes two recesses. Said recesses are formed in the body. The electrically conductive elements include two electrically conductive pins. The electrically conductive pins are respectively disposed in the recesses and are electrically connected to the electric contact portions of the function module.

According to some embodiments of the present disclosure, the multifunctional module device further includes an auxiliary recess and at least one supporting element. The auxiliary recess is formed in the body. The at least one supporting element is disposed in the auxiliary recess.

According to some embodiments of the present disclosure, sizes or colors of the electrically conductive pins of said electrically conductive elements are different, and the size or color of at least one of said electrically conductive pins is identical to a size or a color of corresponding one of said recesses.

According to some embodiments of the present disclosure, each of the electric contact portions is an electrically conductive elastic sheet.

According to some embodiments of the present disclosure, the electric connection module further includes two electrically conductive seats. Said electrically conductive seats are respectively electrically connected to said electrically conductive elements.

According to some embodiments of the present disclosure, the multifunctional module device further includes at least two magnets, which are disposed in the electric connection module and the function module respectively. When the electric connection module and the function module are in an electrical connection position, positions of s magnets are non-overlapping. When the electric connection module and the function module are not in the electrical connection position, the positions of said magnets are overlapping, and surfaces with same polarity of said magnets are opposite to each other.

According to some embodiments of the present disclosure, the number of the magnets is three, two of the magnets are mounted in one of the electric connection module and the function module, and the other one of the magnets is mounted in the other one of the electric connection module and the function module. When the electric connection module and the function module are in the electrical connection position, the positions of the three magnets are non-overlapping. When the electric connection module and the function module are not in the electrical connection position, the positions of two of the three magnets are overlapping, and the surfaces with same polarity of the two of the three magnets are opposite to each other.

According to some embodiments of the present disclosure, the function module includes a protrusion protruding from a bottom of the function module. The electric connection module includes a concave portion recessed in the body, and the protrusion is correspondingly embedded in the concave portion.

According to the aforementioned objectives, the present disclosure provides a lamp. The lamp includes the aforementioned multifunctional module device. The electric connection module is a lighting device.

According to some embodiments of the present disclosure, the function module is used to provide an environmental sensing function.

According to some embodiments of the present disclosure, the function module is used to provide a non-lighting function.

According to some embodiments of the present disclosure, the function module is used to provide a lighting function.

It can be known from the aforementioned embodiments of the present disclosure that the present disclosure mainly uses the electric contact portions of the function module to electrically connect with the electric connection module without setting an independent power supply in the function module, so as to reduce the size of the function module, thereby achieving an effect of lightweight. On the other hand, the present disclosure provides identification methods to remind users of a correct corresponding position between the electric connection module and the function module, such as adjusting the sizes or colors of the electrically conductive pins and the recesses, the protrusion of the function module and the concave portion of the electric connection module, and the magnet of the function module and the magnet of the electric connection module. The multifunctional module device can be applied to lamps, and different function modules can be replaced according to the needs of the users, so as to increase the additional functions and values of the lamps.

BRIEF DESCRIPTION OF THE DRAWINGS

In order to make the above and other objectives, features, advantages, and embodiments of the present invention more comprehensible, the accompanying drawings are described as follows.

DETAILED DESCRIPTION

Embodiments of the present disclosure are discussed in detail below. However, it will be appreciated that the embodiments provide many applicable concepts that can be implemented in s specific contents. The embodiments discussed and disclosed are for illustration only and are not intended to limit the scope of the present disclosure.

Figure 1:
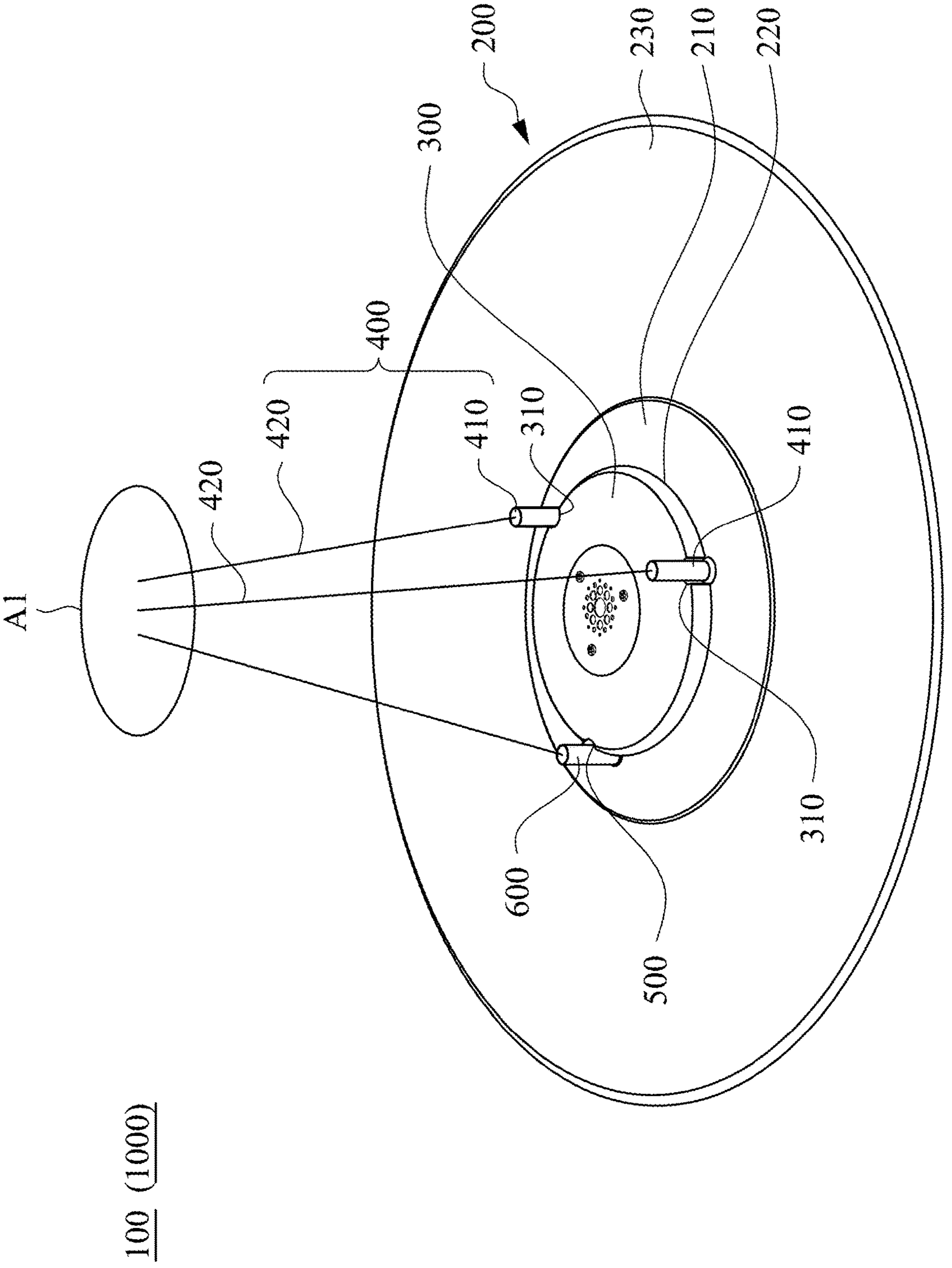
FIG. 1 is a schematic diagram of a multifunctional module device in accordance with some embodiments of the present disclosure.

Referring to FIG. 1, FIG. 1 is a schematic diagram of a multifunctional module device in accordance with some embodiments of the present disclosure. In one embodiment, a multifunctional module device 100 includes an electric connection module 200, a function module 300, and two electrically conductive elements 400. Power sources of the electric connection module 200 and the function module 300 can be the same power supply. For example, after an AC power supply of the mains is converted into a DC power supply A1, and said electrically conductive elements 400 with different electrical properties are used to supply power to the electric connection module 200 and the function module 300. Therefore, the multifunctional module device 100 is a convenient and quick power connection type. When consumers replace different function module 300 by themselves, an electrical conduction is completed, which has an effect of convenient replacement.

The electric connection module 200 includes a body 210 and an opening portion 220, wherein the body 210 has at least one functional module electrically connected to the DC power supply A1. The opening portion 220 is formed in the body 210 and is configured to accommodate the function module 300. For example, the body 210 is a lighting module and includes at least one light bar and a light guide plate 230. The light guide plate 230 can provide a wider illumination range.

Figure 2:
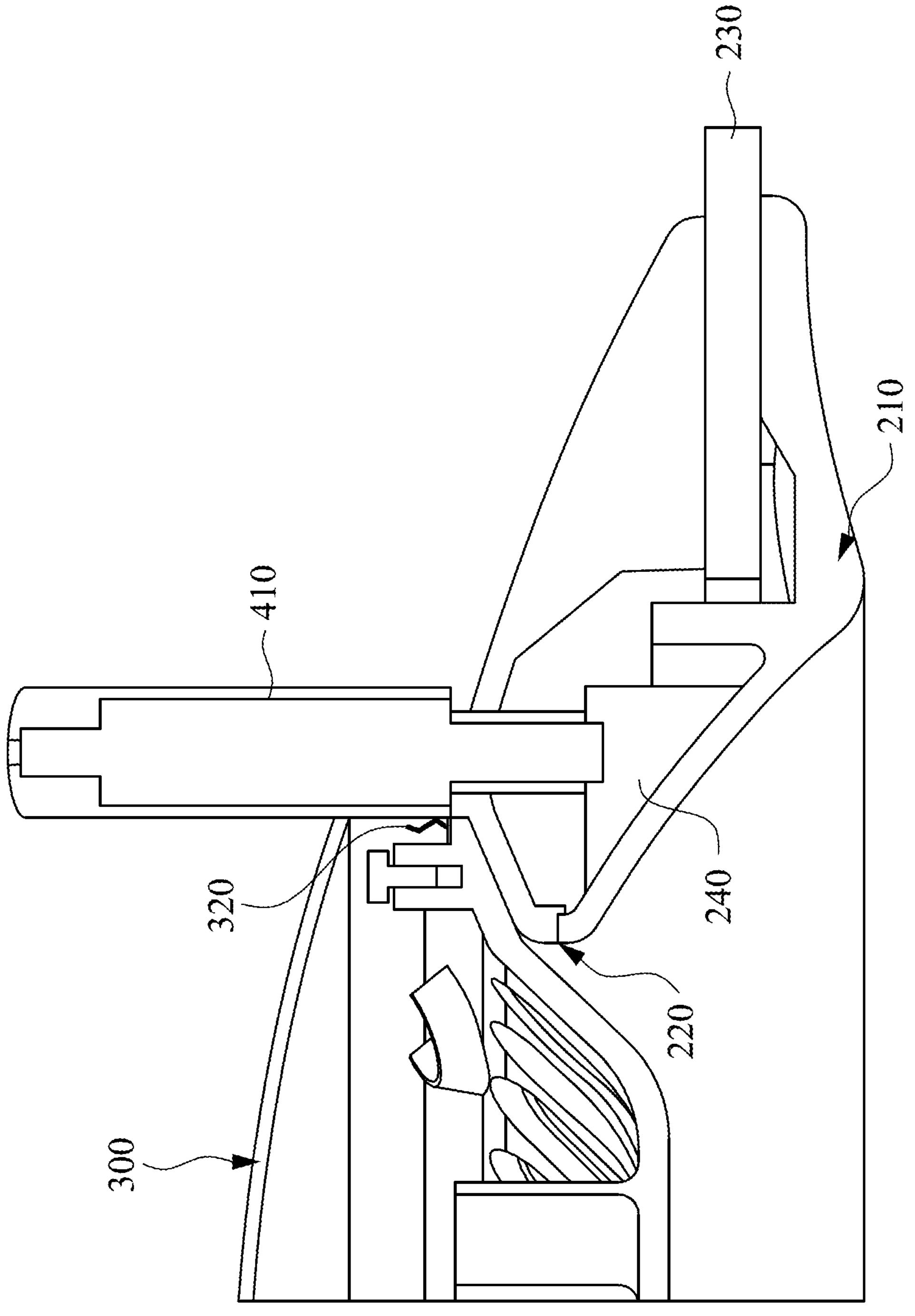
FIG. 2 is a partially enlarged cross-sectional view of a multifunctional module device in accordance with some embodiments of the present disclosure.

Referring to FIG. 1 and FIG. 2, FIG. 2 is a partially enlarged cross-sectional view of a multifunctional module device in accordance with some embodiments of the present disclosure. The function module 300 is embedded in the opening portion 220. The function module 300 includes two electric contact portions 320. In some embodiments, the electric contact portions 320 are electrically conductive elastic sheets. Therefore, when the electric connection module 200 is powered, the function module 300 is electrically connected to the electric connection module 200 through the electric contact portions 320 without setting an independent power supply in the function module 300, such that size of the function module 300 is reduced, thereby achieving an effect of lightweight. In some exemplary examples, the function module 300 may be, for example, a downlight capable of strengthening a downlight function, a bacteriostatic lamp using ultraviolet ray, a fan, and a Bluetooth speaker capable of playing music, but not limited to the above examples. In some exemplary examples, the function module 300 is used to provide an environmental sensing function, such as a motion sensor, a temperature sensor, or a gas sensor. When the sensor detects parameters and reaches an active point, the electric connection module 200 can be turned on or turned off. It should be emphasized that the function module 300 is not limited to the types of functions, as long as the function module 300 can be embedded in the opening portion 220. It can be electrically connected to the electric connection module 200 through the electric contact portions 320 to perform various functions.

Said electrically conductive elements 400 are electrically connected to a positive electrode and a negative electrode of the DC power supply A1 respectively. The electric connection module 200 and the function module 300 are powered by the electrically conductive elements 400, and said electrically conductive elements 400 are respectively electrically connected to said electric contact portions 320 of the function module 300. In one embodiment, the function module 300 further includes two recesses 310. The electrically conductive elements 400 include electrically conductive pins 410 and electrically conductive wires 420. The electrically conductive pins 410 are respectively disposed in the recesses 310 and are electrically connected to the electric contact portions 320 of the function module 300. The electrically conductive wires 420 are connected to the DC power supply A1 and conducted to the electrically conductive pins 410. In one embodiment, the electric connection module 200 further includes two electrically conductive seats 240, and said electrically conductive seats 240 are respectively electrically connected to the electrically conductive elements 400. Therefore, the electrically conductive pins 410 electrically connected to the DC power supply A1 can respectively supply electric energy to the electric connection module 200 and the function module 300 by two electrically conductive seats 240 and the electric contact portions 320. More specifically, the DC power supply A1 is a low-voltage DC power supply, such as a safe voltage of 42V or 36V. In the present embodiment, the electrically conductive pins 410 and the electrically conductive wires 420 of the electrically conductive elements 400 both are charged and can be electrically connected to the outside, so the electric contact portions 320 (i.e., the electrically conductive elastic sheets) of the function module 300 can directly contact the electrically conductive pins 410 to form an electrical conduction state for achieving the effect that consumers can easily detach and assemble the function module 300 by themselves. At least one of the electric connection module 200 and the function module 300 can be quick-detachably and electrically connected to the positive electrode and the negative electrode of the DC power supply A1.

In some embodiments, the multifunctional module device 100 further includes an auxiliary recess 500 and at least one supporting element 600. The auxiliary recess 500 is formed in the function module 300. The supporting element 600 is disposed in the auxiliary recess 500. For example, said electrically conductive elements 400 and the supporting element 600 correspond to the opening portion 220, are spaced apart from each other, and are configured to provide support for the multifunctional module device 100 to keep the multifunctional module device 100 stable. Since the electrically conductive wires 420 of said electrically conductive elements 400 are connected to the multifunctional module device 100 from the same DC power supply A1, said electrically conductive wires 420 extend in oblique directions. Said electrically conductive elements 400 combined with the supporting element 600 form a three-point plane to suspend the multifunctional module device 100 for achieving the effect of increasing a suspension stability.

Figure 3:
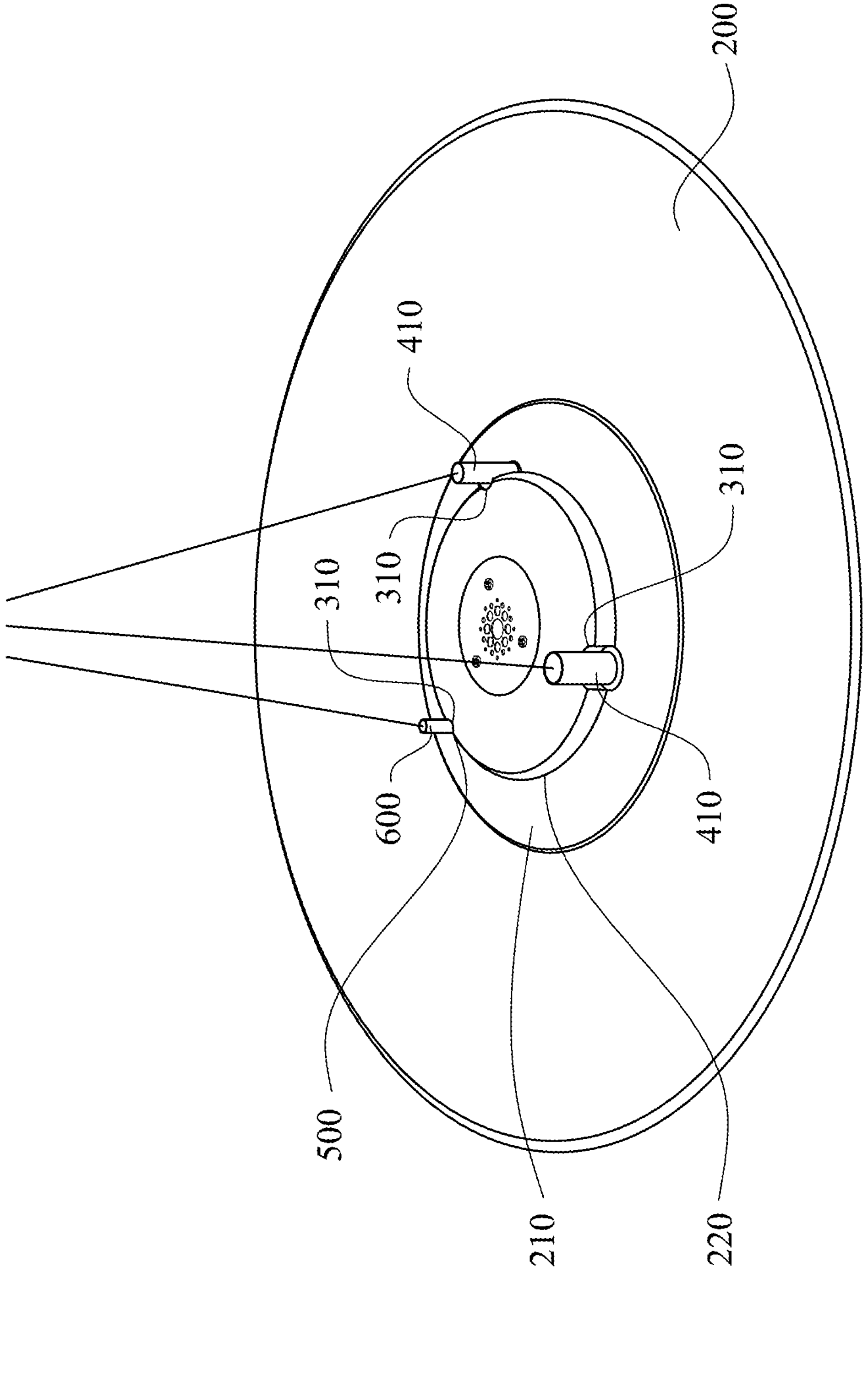
FIG. 3 is an enlarged schematic diagram of a multifunctional module device in accordance with other embodiments of the present disclosure.

Referring to FIG. 3, FIG. 3 is an enlarged schematic diagram of a multifunctional module device in accordance with other embodiments of the present disclosure. In some embodiments, sizes or colors of the electrically conductive pins 410 of said electrically conductive elements 400 are different, and the size or color of at least one of said electrically conductive pins 410 is same as a size or color of a corresponding one of the recesses 310. Therefore, users can distinguish a correct corresponding relationship between said electrically conductive elements 400 and the recesses 310, such that it can prevent that the positive electrode and the negative electrode of the DC power supply A1 are connected to the wrong recesses 310, which causes the positive electrode of the DC power supply A1 to be connected to a negative electrode of the function module 300, and the negative electrode of the DC power supply A1 to be connected to a positive electrode of the function module 300. In some embodiments, the sizes or colors of the electrically conductive pins 410 of said electrically conductive elements 400 are different from the size or color of the supporting element 600, and the size or color of at least one of said electrically conductive pins 410 is same as the size or color of a corresponding one of the recesses 310. Therefore, the users can distinguish the correct corresponding relationship, thereby preventing the positive electrode and the negative electrode of the DC power supply A1 from being inserted into the wrong recesses 310 or the auxiliary recess 500.

Figure 4:
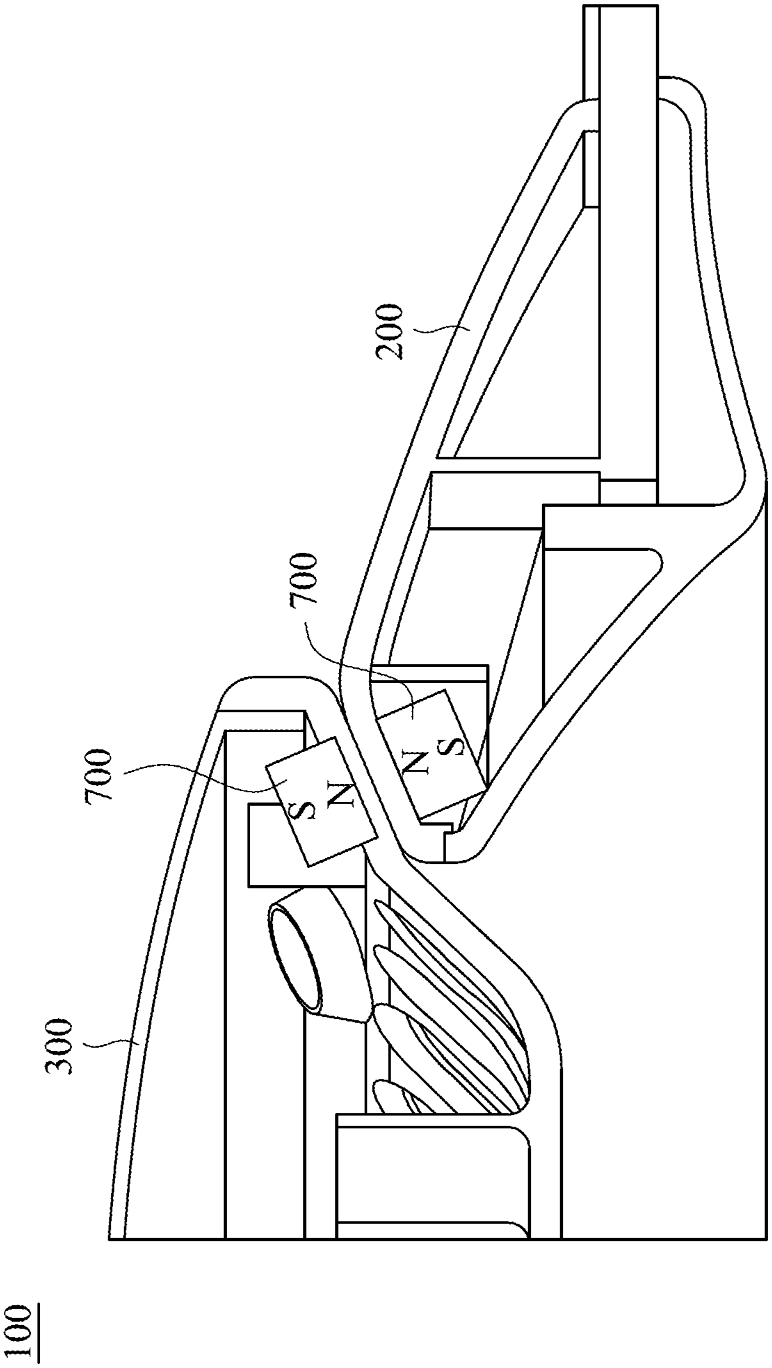
FIG. 4 is a partially enlarged cross-sectional view of a multifunctional module device in accordance with other embodiments of the present disclosure.

Referring to FIG. 4, FIG. 4 is a partially enlarged cross-sectional view of a multifunctional module device in accordance with other embodiments of the present disclosure. In one embodiment, the multifunctional module device 100 further includes at least two magnets 700, and said magnets 700 are disposed in the electric connection module 200 and the function module 300 respectively. When the electric connection module 200 and the function module 300 are in an electrical connection position, positions of said magnets 700 are non-overlapping. When the electric connection module 200 and the function module 300 are not in the electrical connection position, the positions of said magnets 700 are overlapping, and surfaces with same polarity of said magnets 700 are opposite to each other. Therefore, when the users feel a repulsive force between the electric connection module 200 and the function module 300 during the assembling process, the users can aware that the electric connection module 200 and the function module 300 are not in a correct corresponding position.

Figure 5A:
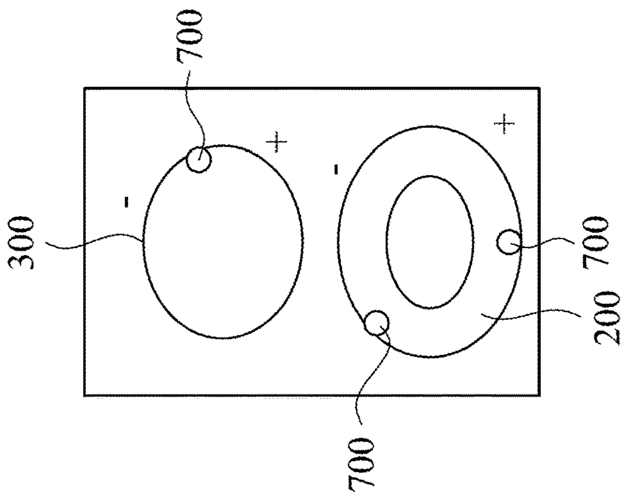
FIG. 5A to FIG. 5C are schematic diagrams showing an electrical connection position and non-electrical connection position in accordance with one embodiment of the present disclosure.
Figure 5B:
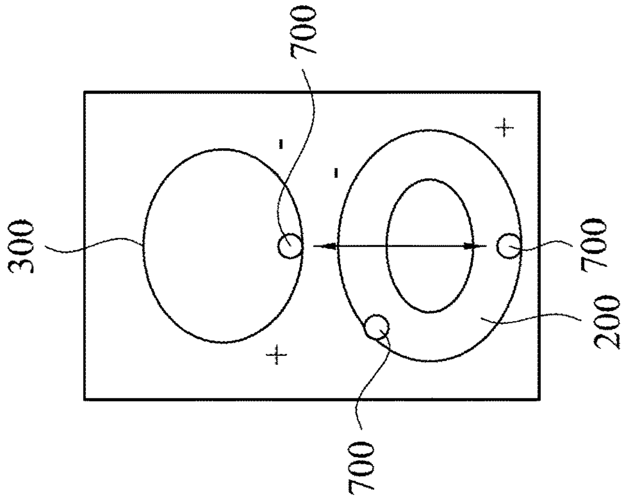
Figure 5C:
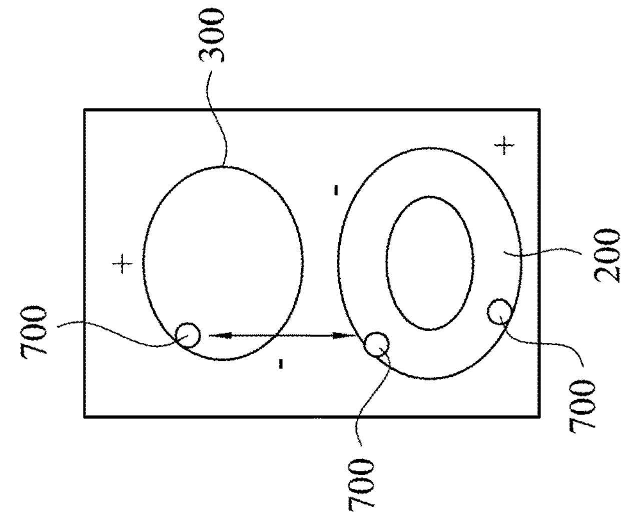

Referring to FIG. 4 and FIG. 5A to FIG. 5C, FIG. 5A to FIG. 5C are schematic diagrams showing an electrical connection position and non-electrical connection position in accordance with one embodiment of the present disclosure. In some exemplary examples, the number of the at least two magnets 700 is three, wherein two of the magnets 700 are disposed in one of the electric connection module 200 and the function module 300, and the other magnet 700 is disposed in the other one of the electric connection module 200 and the function module 300. As shown in FIG. 5A, when the electric connection module 200 and the function module 300 are in the electrical connection position, the positions of the three magnets 700 are non-overlapping. As shown in FIG. 4, FIG. 5B, and FIG. 5C, when the electric connection module 200 and the function module 300 are not in the electrical connection position, the positions of two of the three magnets 700 are overlapping, and the surfaces with same polarity of the two of the three magnets 700 are opposite to each other. Therefore, when the users feel the repulsive force between the electric connection module 200 and the function module 300 during the assembling process, the users can aware that the electric connection module 200 and the function module 300 are not in the correct corresponding position. Thus, the corresponding position of the electric connection module 200 and the function module 300 must be readjusted, so that the function module 300 can be successfully embedded in the electric connection module 200.

Figure 6:
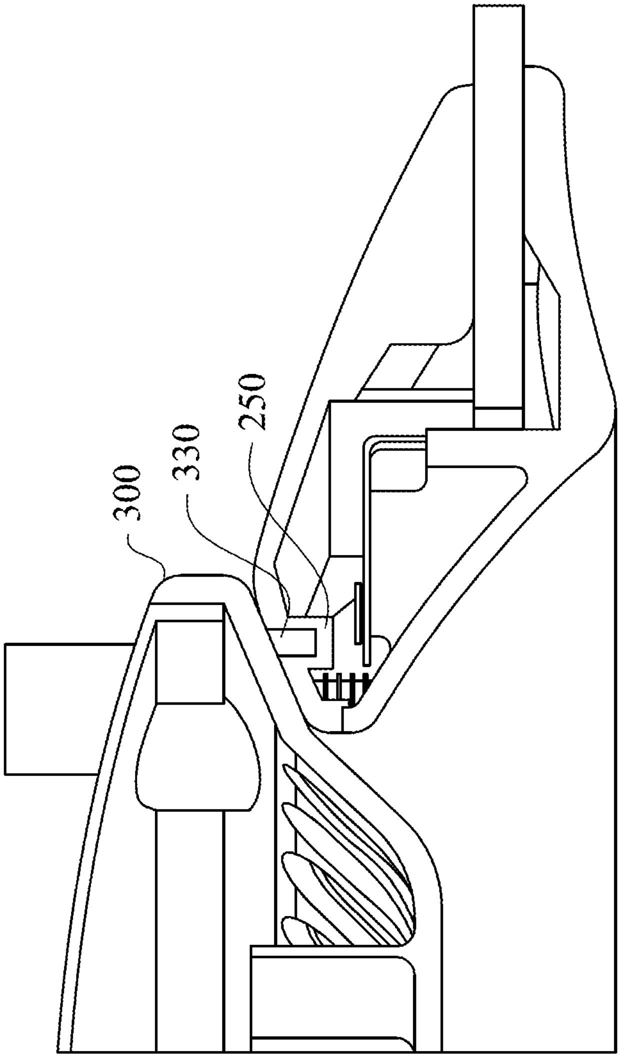
FIG. 6 is a partially enlarged cross-sectional view of a multifunctional module device in accordance with still other embodiments of the present disclosure.

Referring to FIG. 6, FIG. 6 is a partially enlarged cross-sectional view of a multifunctional module device in accordance with still other embodiments of the present disclosure. In some embodiments, the function module 300 includes a protrusion 330 protruding from a surface of the function module 300, which faces the electric connection module 200. The electric connection module 200 includes a concave portion 250 recessed in the body 210, and the protrusion 330 can be correspondingly embedded in the concave portion 250. Therefore, the users can confirm whether the electric contact portions 320 are correctly connected to the corresponding electrically conductive elements 400 in the process of assembling the function module 300, thereby preventing the positive electrode and the negative electrode of the DC power supply A1 from being connected to the wrong electric contact portions 320.

Referring to FIG. 1, in some embodiments, a lamp 1000 includes the multifunctional module device 100 shown in FIG. 1. The electric connection module 200 is a lighting device and can be connected to the DC power supply A1 through the electrically conductive elements 400 to obtain electric energy to provide a lighting function. In some exemplary examples, the function module 300 is used to provide the environmental sensing function, such as the motion sensor, the temperature sensor, or the gas sensor. When the sensor detects parameters and reaches the active point, the electric connection module 200 can be turned on or turned off. In some exemplary embodiments, the function module 300 is used to provide a non-lighting function, such as the bacteriostatic lamp using the ultraviolet ray, the fan, and the Bluetooth speaker capable of playing music. In other exemplary examples, the function module 300 and the electric connection module 200 both provide the lighting function, such as the downlight capable of strengthening the downlight function, or the lighting module with other optical characteristics.

It can be known from the aforementioned embodiments of the present disclosure that multifunctional module device is the convenient and quick power connection type. The consumers can easily detach and assemble at least one of the function modules in the multifunctional module device. The present disclosure mainly using the electric contact portions of the function module to electrically connect with the electric connection module without setting an independent power supply in the function module, so as to reduce the size of the function module, thereby achieving an effect of lightweight. On the other hand, the present disclosure provides identification methods to remind users of the correct corresponding position between the electric connection module and the function module, such as adjusting the sizes or colors of the electrically conductive pins and the recesses, the protrusion of the function module and the concave portion of the electric connection module, and the magnet of the function module and the magnet of the electric connection module. The multifunctional module device can be applied to lamps, and different function modules can be replaced according to the needs of the users, so as to increase the additional functions and values of the lamp.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A multifunctional module device, comprising:

an electric connection module comprising:

a body; and an opening portion mounted in the body;

a function module embedded in the opening portion and comprising two electric contact portions; and two electrically conductive elements electrically connected to a positive electrode and a negative electrode of a DC power supply respectively, wherein the electric connection module and the function module are powered by said electrically conductive elements, and said electrically conductive elements are respectively electrically connected to said electric contact portions of the function module.

2. The multifunctional module device of claim 1, wherein the function module comprises two recesses; and said electrically conductive elements comprise two electrically conductive pins, said electrically conductive pins are respectively disposed in said recesses and are electrically connected to said electric contact portions of the function module.

3. The multifunctional module device of claim 2, wherein the multifunctional module device further comprises:

an auxiliary recess formed in the function module; and at least one supporting element disposed in the auxiliary recess.

4. The multifunctional module device of claim 2, wherein sizes or colors of the electrically conductive pins of said electrically conductive elements are different, and the size or color of at least one of said electrically conductive pins is identical to a size or a color of corresponding one of said recesses.

5. The multifunctional module device of claim 3, wherein sizes or colors of the electrically conductive pins of said electrically conductive elements are different from size or color of the at least one supporting element, and the size or color of at least one of said electrically conductive pins is identical to a size or a color of corresponding one of said recesses.

6. The multifunctional module device of claim 1, wherein each of said electric contact portions is an electrically conductive elastic sheet.

7. The multifunctional module device of claim 1, wherein the electric connection module further comprises two electrically conductive seats, said electrically conductive seats are respectively electrically connected to said electrically conductive elements.

8. The multifunctional module device of claim 1, wherein the multifunctional module device further comprises at least two magnets disposed in the electric connection module and the function module respectively;

wherein when the electric connection module and the function module are in an electrical connection position, positions of said magnets are non-overlapping;

wherein when the electric connection module and the function module are not in the electrical connection position, the positions of said magnets are overlapping, and surfaces with same polarity of said magnets are opposite to each other.

9. The multifunctional module device of claim 8, wherein the number of the at least two magnets is three, two of the magnets are mounted in one of the electric connection module and the function module, and the other one of the magnets is mounted in the other one of the electric connection module and the function module;

wherein when the electric connection module and the function module are in the electrical connection position, the positions of the three magnets are non-overlapping;

wherein when the electric connection module and the function module are not in the electrical connection position, the positions of two of the three magnets are overlapping, and the surfaces with same polarity of the two of the three magnets are opposite to each other.

10. The multifunctional module device of claim 1, wherein the function module comprises a protrusion protruding from a bottom of the function module, the electric connection module comprises a concave portion recessed in the body, and the protrusion is correspondingly embedded in the concave portion.

11. A lamp, comprising:

a multifunctional module device in claim 1, wherein the electric connection module is a lighting device.

12. The lamp of claim 11, wherein the function module is used to provide an environmental sensing, and the function module is a motion sensor, a temperature sensor, or a gas sensor.

13. The lamp of claim 11, wherein the function module is used to provide a non-lighting function, and the function module is a bacteriostatic lamp using ultraviolet ray, a fan, or a Bluetooth speaker capable of playing music.

14. The lamp of claim 11, wherein the function module is used to provide a lighting function.

* * * * *